(12) United States Patent
Sabol

(10) Patent No.: US 10,202,255 B2
(45) Date of Patent: Feb. 12, 2019

(54) METHOD OF USING DISPENSER ROLL LOCK DEVICE

(71) Applicant: Gail Frances Sabol, North Huntingdon, PA (US)

(72) Inventor: Gail Frances Sabol, North Huntingdon, PA (US)

( * ) Notice: Subject to any disclaimer, the term of this patent is extended or adjusted under 35 U.S.C. 154(b) by 301 days.

(21) Appl. No.: 15/156,452

(22) Filed: May 17, 2016

(65) Prior Publication Data

US 2016/0340147 A1 Nov. 24, 2016

Related U.S. Application Data

(60) Provisional application No. 62/164,248, filed on May 20, 2015.

(51) Int. Cl.
| | |
|---|---|
| *B65H 16/00* | (2006.01) |
| *B65H 16/06* | (2006.01) |
| *B65H 75/08* | (2006.01) |
| *B65H 75/18* | (2006.01) |
| *B65H 75/24* | (2006.01) |

(52) U.S. Cl.
CPC ......... *B65H 75/185* (2013.01); *B65H 16/005* (2013.01); *B65H 16/06* (2013.01); *B65H 75/08* (2013.01); *B65H 75/241* (2013.01)

(58) Field of Classification Search
CPC ...... B65H 16/005; B65H 16/06; B65H 75/08; B65H 75/185; B65H 75/241; B65H 49/322

See application file for complete search history.

(56) References Cited

U.S. PATENT DOCUMENTS

| | | |
|---|---|---|
| 4,840,299 A | 6/1989 | Burns |
| 6,725,753 B2 | 4/2004 | Bell |
| 2004/0144825 A1 | 7/2004 | Vandenberg |
| 2011/0108599 A1* | 5/2011 | Nottingham ......... B65H 35/002 225/77 |
| 2013/0299545 A1 | 11/2013 | Chang |

FOREIGN PATENT DOCUMENTS

WO   WO-0044661 A1 *   8/2000   ........... B65H 49/322

* cited by examiner

*Primary Examiner* — William E Dondero
(74) *Attorney, Agent, or Firm* — Clark & Brody

(57) ABSTRACT

A dispensing roll lock device comprises at least one rod and end caps designed to attach to ends of the rods. The rod is sized to be inserted through end locks on sides of a dispensing box and through the roll in the box. The end caps secure the rod in the box so that the roll of the dispensing box is secured in the box when dispensing material from the roll.

7 Claims, 7 Drawing Sheets

METHOD OF USING DISPENSER ROLL LOCK DEVICE

FIELD OF THE INVENTION

The present invention is directed to a dispensing device to aid in the dispensing of a thin web of material such as plastic wrap, aluminum foil, parchment paper, wax paper and the like, and, in particular, to a device that locks the roll used for dispensing the thin web from a dispensing box.

BACKGROUND ART

There is a long history of devices to aid in the dispensing of small portions of sheet materials from rolls of indeterminate length. There are a significant number of prior art patents and publication that teach methods and apparatus to accomplish a wide variety of dispensing actions and are reflective of the amount of effort which has been put into this area over the years. Products currently available to solve the problem are a manufactured dispenser boxes such as a wrapping film dispenser in United States Published Patent Application No. 2013/0299545, household wrap dispenser in United States Published Patent Application No. 2004/0144825, dispenser adapter in U.S. Pat. No. 4,840,299, and dispenser for roller material in U.S. Pat. No. 6,725,753. However, these dispensers do not always accommodate the cardboard roll size sold in disposable dispenser boxes. Cabinets and racks that are also wall mounted or fit into drawers are also an option.

In 1996, Reynolds Wrap started putting perforated end tabs on the end of their dispenser boxes to hold in the roll of product. Over time almost all companies have duplicated the end lock. There can be various instructions on the box such as "Press Here to Lock Roll". The end locks are ineffective and the product can still pull out of the box. Other products to address this problem are expensive, bulky and can require the consumer to repeatedly buy the wrap from the company from which they purchased the dispenser. There are dispensers which you put the cardboard box into the dispenser, racks or containers that hold the roll in place.

As the rolls of dispenser boxes are known to come out of the box when dispensing the material thereon, a need exists to provide improvements in the dispensing of the material from these kinds of dispenser boxes. The present invention responds to this need with an improved way to hold the roll of dispenser box when the material is being dispensed.

SUMMARY OF THE INVENTION

It is one object of the present invention to improve the performance of commercially available products sold in disposable dispenser boxes of the pull and tear type. The inventive dispenser roll lock device is inexpensive, reusable and 100% effective. There is no product currently on the market with a single rod of exact length 13, 19, and 25 inches, diameter of ½ inch with attaching end caps that when inserted into the disposable dispenser boxes will hold the dispenser roll found in prior art dispensing boxes for sheet materials like foils, plastic wrap, wax paper, and the like.

BRIEF DESCRIPTION OF THE DRAWINGS

Reference is now made to the drawings of the invention wherein.

DETAILED DESCRIPTION OF THE INVENTION

Figure 1:
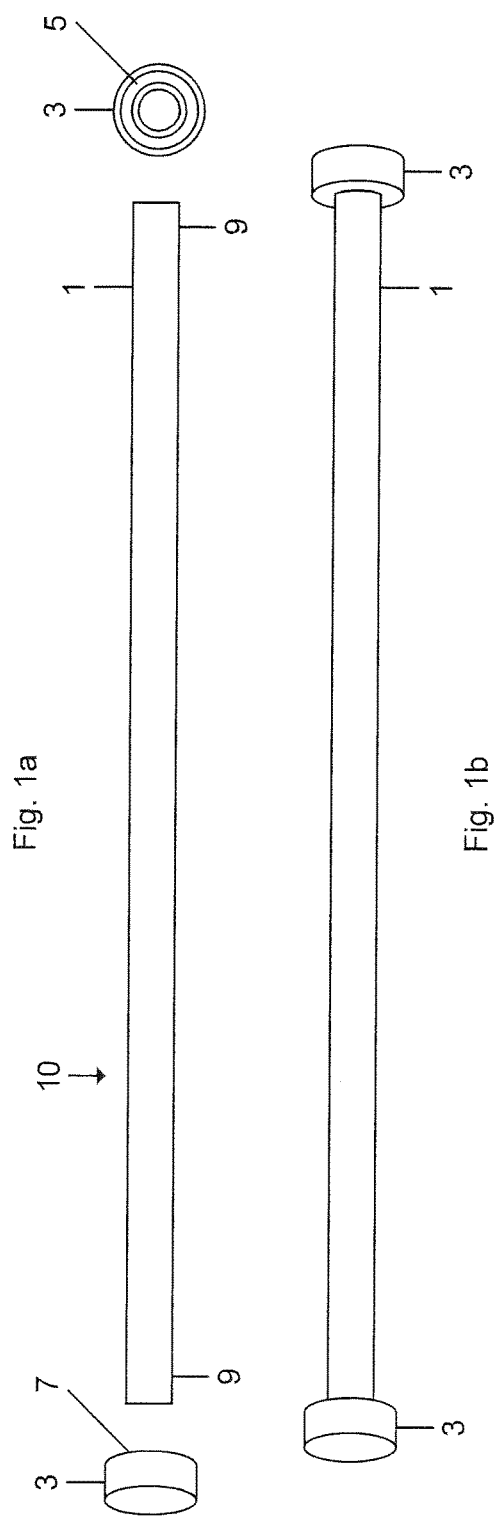
FIGS. 1a and 1b are views of the dispenser roll lock device according to a first embodiment of the present invention.

The inventive dispenser roll lock device is designed to be used with boxes that contain a web of material that are designed to be dispensed from the box using a roll held by the box. The inventive dispenser roll lock device allows free rotation of the roll of web material while holding or locking the roll of dispensed plastic, foil, wax paper, parchment paper, etc., in the original box.

More particular, the dispenser roll lock device includes rods and associated parts which act as a locking device to aid in dispensing of thin webs of material, plastic wrap, aluminum foil, parchment paper etc. from rolls contained in disposable dispensers which, preferably, have perforated end caps. The assembled dispenser roll lock device is sized to hold or lock the roll of web material into place in a disposable dispenser box containing the web material.

The dispenser roll lock device includes a rod, which can be made of a solid or hollow plastic, wood, metal or virtually any material and have varying shapes, diameters and lengths and made of wood, plastic, metal or any other material. End caps of various sizes and design are provided and designed to attach to ends of the rod. The attachment can be any kind, including screwed on, pushed on, mechanically fastened, and glued, combinations thereof. In fact, any method of attaching the end caps to the rod ends can be employed.

The rod can be a two-piece telescoping rod with one hollow rod and one smaller diameter rod of varying shapes, diameters and lengths made of wood, plastic, metal or any other material with attached or unattached end caps of various designs, sizes and materials.

The rod can also be a three-piece telescoping rod consisting of two smaller diameter rods and one hollow rod of varying shapes, diameters and lengths made of wood, plastic, metal or any other material with attached or unattached end caps of various designs, sizes and material.

The dispenser roll lock device can be a molded one if made from plastic. It can also be shaped to fit into the end lock of a disposable dispenser box for web material. Shapes of the rods could be would be half-moon, triangle, round, square, or any other shape.

The rod is sized in length so that it would fit into the roll of a disposable dispenser box and extend beyond the ends of the box so that the end caps can be attached.

The rod can come in different lengths to accommodate the types of dispenser boxes commonly sold for web materials like foil, plastic wrap, wax paper, parchment paper, etc.

Larger diameter and longer rods could be used to fit disposable dispenser boxes for web material used in commercial kitchens, such as restaurants or food services.

In place of end caps, the rods can include holes drilled perpendicular near ends of rod, and cotter pins or the like can be placed in the holes to hold rod in place in the roll of the dispenser box.

The rods can also be collapsible like a tent pole, bendable and be made with multiple parts.

The dispenser roll lock device may also be a set (2) of end caps with small male rods and female inserts that are sized to fit the inner diameter of the web material roll. In this embodiment, the roll will need to be removed from the dispenser box so that the female inserts can be press fit into the open ends of the roll. With the inserts in place, the roll can be returned to the dispensing box. The end caps with small male rods designed to engage openings in the female inserts are provided. The male rods are inserted into each opening in each insert through the perforated end caps of the dispenser box. The rods and openings in the female inserts are sized so that the rods are press fit into the openings to lock the roll to lock them in place. Other ways of securing the rods of the end caps and the female inserts can be employed, e.g., a threaded attachment for example.

One embodiment of dispenser roll lock of the invention is designated by the reference numeral 10 and is shown in FIGS. 1a-4. With reference to FIG. 1a, the dispenser roll lock includes a hollow rod 1 of specified length and a pair of end caps 3. The end caps 3 have an annular recess 5 on one end 7 thereof. The annular recess is sized to receive the annular end 9 of the rod 1 so that the end caps 3 can be pushed to fit onto the ends of the rod 1. FIG. 1b shows the end caps 3 installed on the rod 1.

Figure 2:
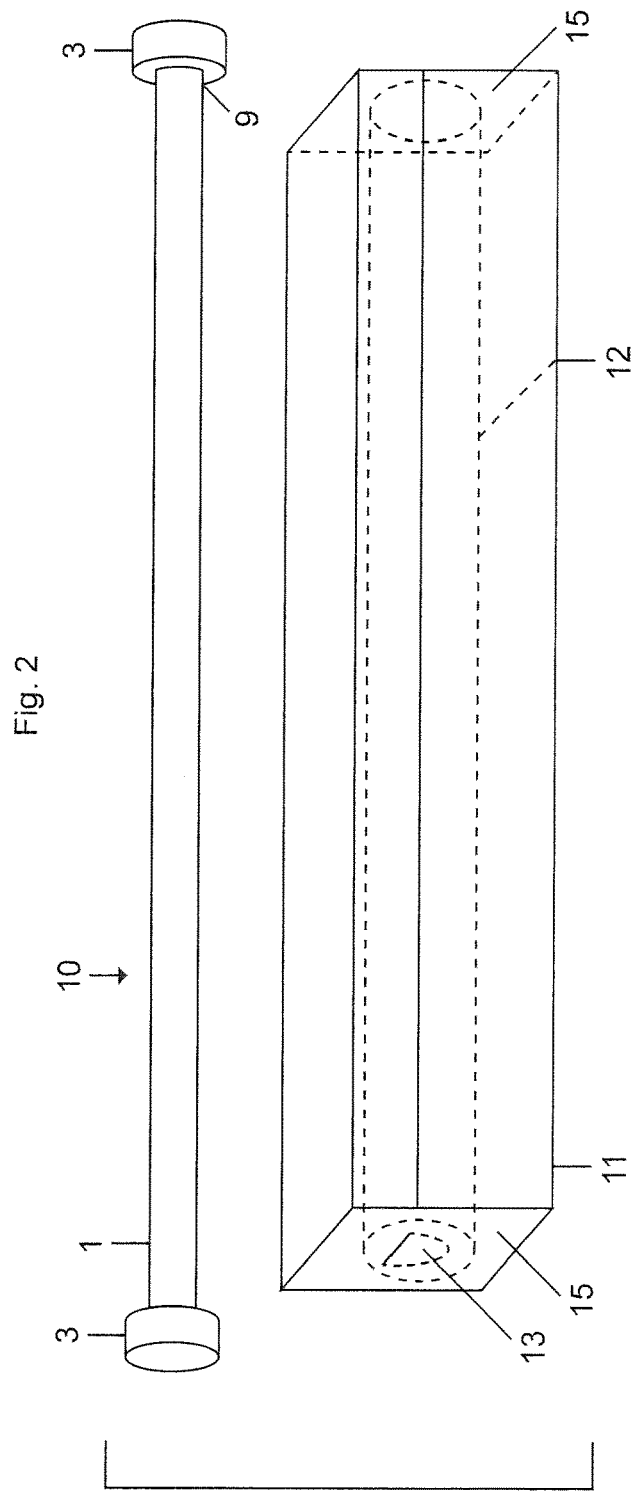
FIG. 2 is a view of the dispenser roll lock device positioned above a conventional dispensing box with which it will be associated.

FIG. 2 shows the dispenser roll lock device 10 in relation to a box 11 that holds a web of material, e.g., plastic wrap, foil, or the like on a roll 12. The rod is sized in length to be longer than the box length so that the ends 9 of the rod protrude past the ends of the box 11 when the rod is passed through the box 11.

The box 11 is a conventional dispenser box and includes a perforated end locks or roll flaps 13 on ends 15 thereof.

Figure 3:
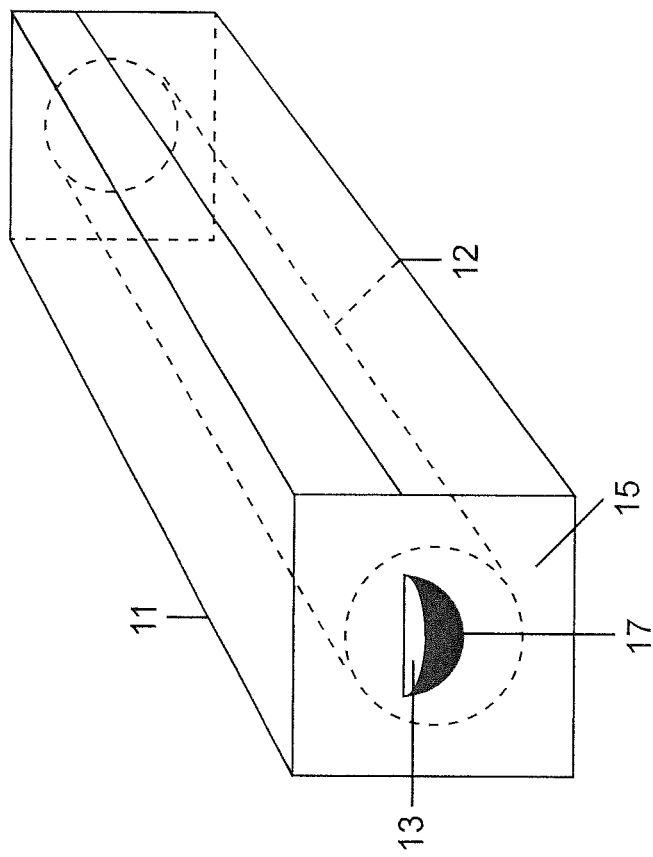
FIG. 3 is a view of the end of dispenser box showing a perforated end lock.
Figure 4:
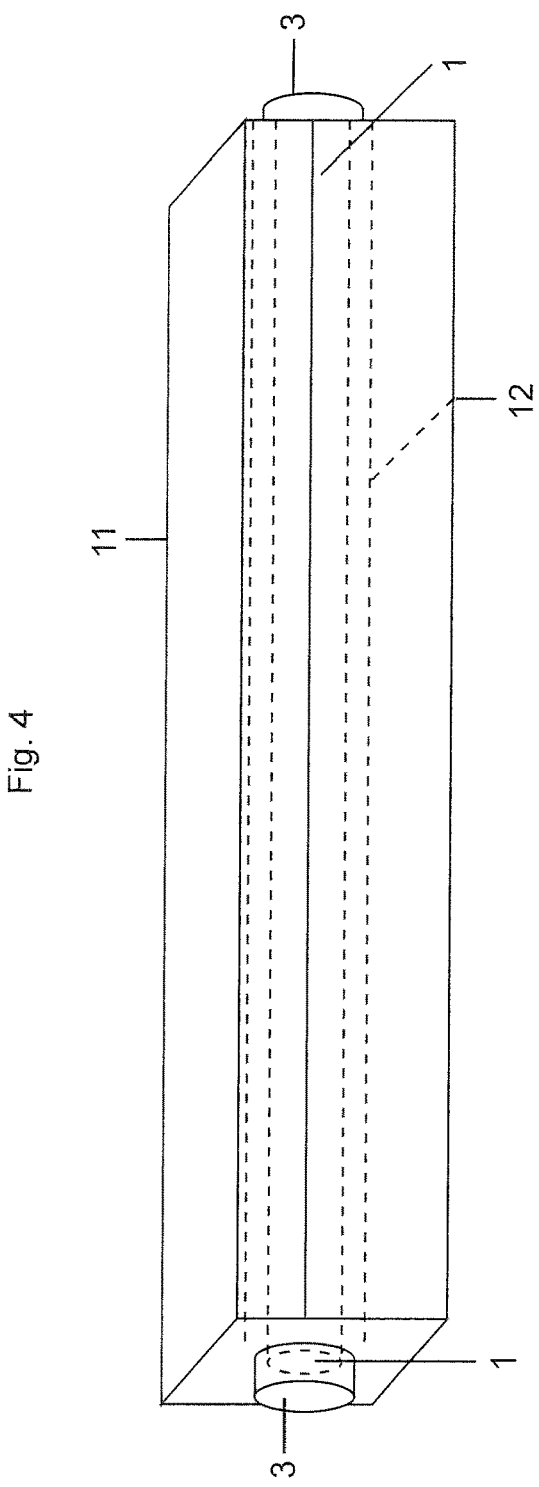
FIG. 4 is a view of the dispenser roll lock device fitted into dispenser box.

FIG. 3 shows the perforated end lock or roll lock flap 13 pushed in to create an opening 17 to allow access to the inside of a roll 12 holding the web of material located inside the box. The rod 1 without the end caps 3 is inserted through one opening 17 in the box end 15 and through the roll 12 in the box. As the rod 1 is sized in length to be longer than the box, the ends 9 of the rod 1 protrude through the openings 17 so that the end caps can be inserted on the rod ends 9 as shown in FIG. 4. With the rod protruding through the openings 17 and held by the end caps 3, the roll 12 is held in place securely in the box and cannot be pulled out when the web is being dispensed from the box 11. If the box does not have a roll lock flap, an opening can be created in the box end 15 so that inside of the roll in the box can be accessed for rod insertion.

Figure 5:
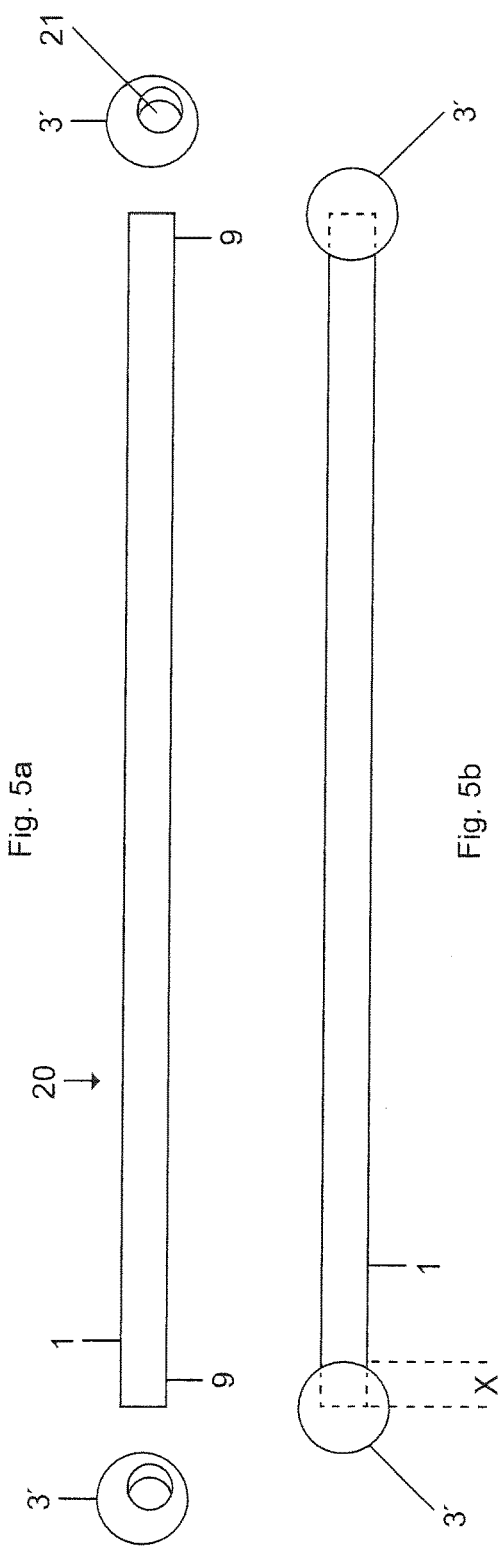
FIGS. 5a and 5b are views of another embodiment of the inventive device.

FIGS. 5a and 5b shows an alternative embodiment 20, wherein the end caps 3' are spherical in shape and have a bore 21 to receive the rod end 9, with FIG. 5b showing the end caps 3' attached to the rod 1.

Figure 6:
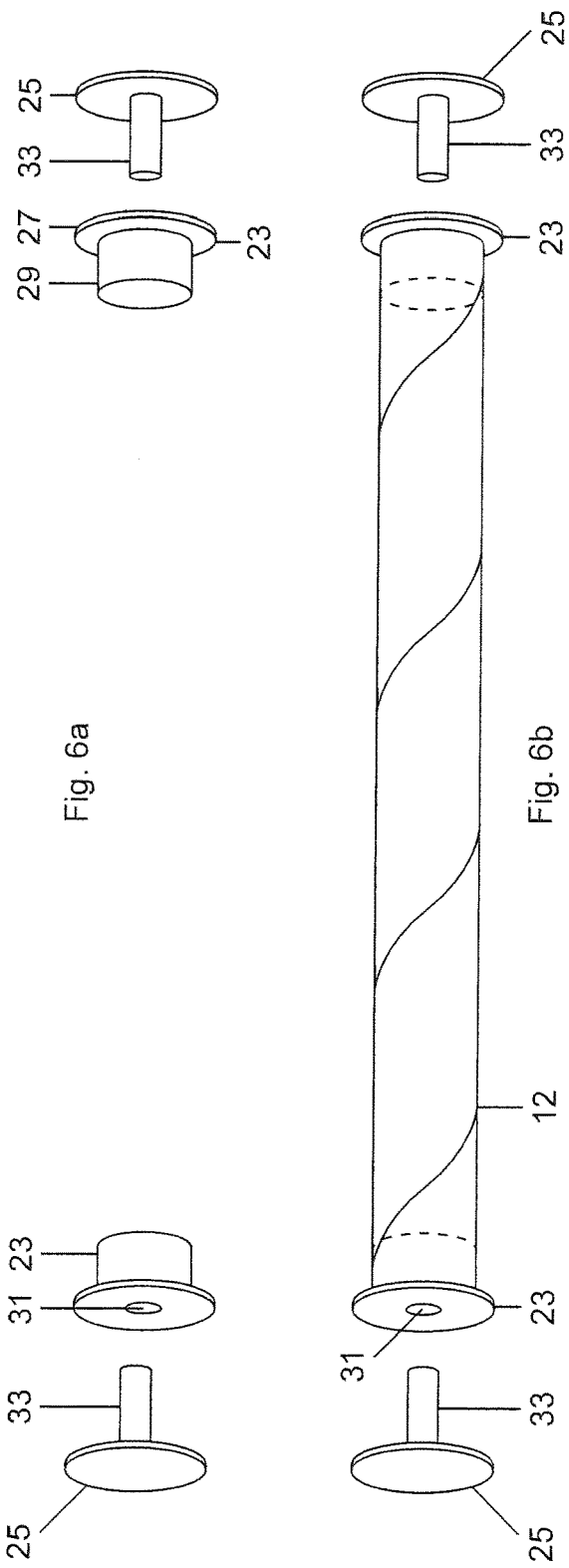
FIGS. 6a and 6b are views of another embodiment of the inventive device.

Another embodiment of the dispenser roll lock device is shown in FIGS. 6a and 6b. FIG. 6a shows a pair of roll inserts 23 and pin caps 25. The roll inserts 23 have a flange 27 and a cylindrical portion 29. The cylindrical portion 29 is sized to fit inside the end of the roll 12 and the flange 27 rests against the edge of the roll. The insert 23 also has a bore 31 sized to receive a pin 33 of the pin cap 25. FIG. 6b shows the inserts 23 installed on the ends of the roll 12 and the pin caps aligned for insertion of the pin 33 into bore 31.

In use, the roll 12 is removed from the box 11 and the inserts 23 are installed on ends thereof. The roll is then placed back in the box 11 and the perforated roll locks 13 are pushed in to create the openings 17. Each pin 31 is inserted into the bore 33 with the end 15 of the box positioned between the insert 23 and pin cap 25. This prevents the roll 12 from slipping out of the box 11.

Figure 7:
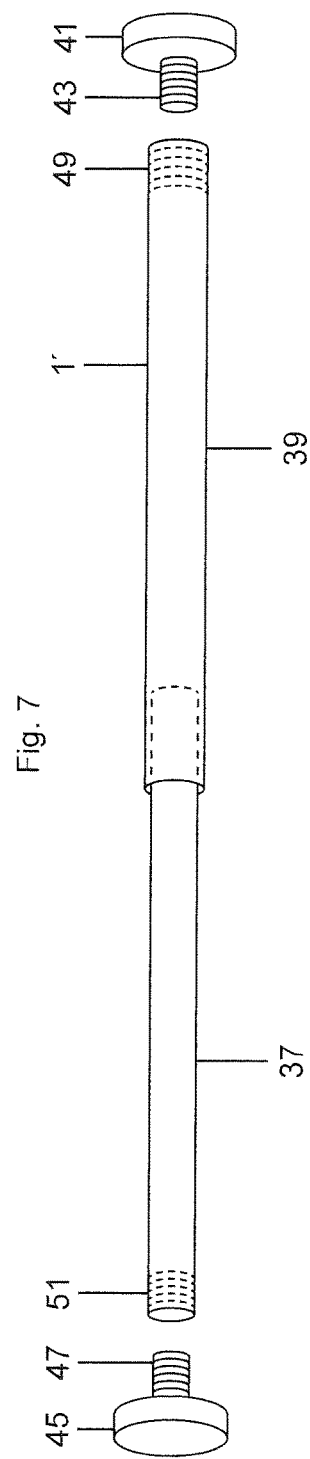
FIG. 7 shows yet another embodiment of the inventive device using a telescopic rod.

FIG. 7 shows a telescoping rod 1' with rod sections 37 and 39. Instead of having a fixed length rod 1 that needs to be sized according to the length of the box 11, the telescoping rod 1' can have its length adjusted by relative movement of the rod sections 37 and 39 so that one rod can accommodate different length boxes. FIG. 7 also depicts an embodiment of the invention wherein end caps are attached to an inside of the rod. End caps 41 and 45 are provided with threaded ends 43 and 47. The hollow rod 39 has internal threads 49 on an end thereof. Similarly, hollow rod 37 has internal threads 51 on an end thereof. Once the roll lock flaps of a dispenser box would be pushed in and the rods 37 and 39 are inserted into the box roll, the threaded ends 43 and 47 are threaded and attach to the internal threads 49 and 51 of the rods 39 and 37. In use, the rods could be telescoped to a longer length so that the rod end can be gripped for end cap attachment and then the length of the rods could be adjusted so that the end caps are flush with the box ends. A one-piece hollow rod could also be used in this embodiment and a push fit for attachment could be used to connect the end caps to the roll.

Figure 8:
FIG. 8 is a cross section view of one embodiment of the rod of the invention.

FIG. 8 shows a cross section view of a half mooned shaped rod 1", which matches the shape of the opening 17 of the roll lock in FIG. 3.

The manner of attachment of the caps and the rod ends can be any type that will keep the rod securely attached to the cap, including press fit attachment as shown in FIGS. 1a and 1b. While the caps are shown to fit over the outside of the rod when attached thereto, the caps could be designed to have a portion that fits in the inside of the rod.

For the embodiment of the invention using the rod, the rod is particularly sized to accommodate the length of conventional dispensing boxes. Typically, the dispensing box is slightly larger than the length of the roll inside, maybe ¼ to ½ inch. Therefore, the rod is usually about 12.5, 15.5, 18.5, and 24.5 inches in length. When using a fixed length rod, the rod should be longer than length of the box so that the end caps can be attached to rod ends. For the case where the end caps fit over the end of the rod, the rods can come in lengths of around at least 13.5 inches, at least 16.5 inches, at least 19.5 inches and at least 25.5 inches in length. Put another way, the length of the rod is the length of the box plus an additional length to allow the end caps to be attached. If the end caps are to attach on the outside of the rod, see FIGS. 5a and 5b as an example, the rod needs to be longer than the box at least the length of the bore designed to fit into the end cap. For example, end caps with bore lengths, shown as "X" in FIG. 5b, for example of about ½ inch, means that the rod should be at least 1 inch longer than the dispensing box. If the end caps are to attach to an inside of the rod, the rod can be the length of the box or slightly smaller as the end caps would protrude into the box and inside the rod when attached. Thus, the rod length can range from slightly less than the box length (end caps fit inside the rod) to a length up to two inches more than the box length (end caps fit on the outside of the rod) to accommodate the end caps. For box lengths of 12.5 inches, the rod could range ±2 inches from this length. This variance would apply regardless of the box length, either the approximate 12.5 inches or the longer boxes of around 15.5, 18.5, and 24.5 inches.

The diameter of the rod should be such that it can easily fit in the roll of the dispenser box and the end lock. Typical diameters of the rolls in a dispensing box are around 1 to 1.25 inches so that the rod diameter should be less than this. However, as the end locks on the box are smaller than the diameter of the roll, the rod diameter should be up to about 0.5 inches so that it can easily fit through the end lock.

As dispensing boxes come in different lengths, a kit could be provided with a set of different length rods, say three for example, and end caps to fit on each different length rod. End caps for each rod in the kit could also be provided.

Although the invention has been described in teens of selected preferred embodiment made of plastic, the invention should not be deemed limited thereto, since other embodiments and modifications will readily occur to one skilled in the art. One such modification would be the dispenser roll lock would be molded or fabricated into the shape to fit into the end lock of the disposable dispenser box. Shape could be half-moon, triangle, round, square etc. The rod portion of invention could be collapsible, bendable or be made in multiple pieces to make shipping more affordable. The overall size can be increased to fit products used in commercial business such as restaurants or bakeries.

As such, an invention has been disclosed in terms of preferred embodiments thereof which fulfills each and every one of the objects of the present invention as set forth above and provides a new and improved device to dispense flat material from a dispensing device and a method of use.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of securing a dispenser box roll holding a web material comprising:
   providing a dispenser roll lock device comprising:
   at least one rod and a pair of end caps, each end cap is removable and attaches to an end of the rod;
   pressing in the end lock on each side end of the box or making an opening in each side end to access an inside of the roll;
   inserting the rod through the side ends of the box and the roll;
   attaching the end caps to the ends of the rod to prevent the roll from being removed from the box.

2. The method of claim 1, wherein the rod has a length of ±2 inches based on the length of the box.

3. The method of claim 1, wherein the rod is telescoping to accommodate boxes of different lengths.

4. The method of claim 1, wherein the web material is one of plastic wrap, aluminum foil, wax paper, and parchment paper.

5. The method of claim 1, wherein, the rod is longer than a length of the box and each end cap is attached to an outside of each end of the rod extending from the box.

6. The method of claim 1, wherein the rod is shorter than a length of the box and each end cap is attached to an inside of each end of the rod.

7. The method of claim 1, further comprising providing a plurality of rods, each of the plurality of rods having a different length and capable of being used with different length boxes and optionally providing a plurality of end caps to match the plurality of rods.

\* \* \* \* \*